United States Patent

[11] 3,631,348

[72] Inventor William L. Lehmann
Indianapolis, Ind.

[21] Appl. No. 800,607
[22] Filed Feb. 19, 1969
[45] Patented Dec. 28, 1971
[73] Assignee RCA Corporation

[54] SIGNAL DISTRIBUTION SYSTEM
4 Claims, 1 Drawing Fig.

[52] U.S. Cl. .......... 325/458, 325/308, 325/316, 325/368, 325/370
[51] Int. Cl. .......... H04b 1/06
[50] Field of Search .......... 325/308, 316, 458–463, 370, 301, 368, 451; 333/7; 178/5.4, 5.8

[56] References Cited

UNITED STATES PATENTS

| | | | |
|---|---|---|---|
| 3,528,044 | 9/1970 | Manicki .......... | 325/459 |
| 3,135,922 | 6/1964 | Eland .......... | 325/461 |
| 3,264,566 | 8/1966 | Kaufman et al. .......... | 325/459 |
| 3,465,344 | 9/1969 | Scott et al. .......... | 325/308 |

*Primary Examiner*—Robert L. Richardson
*Assistant Examiner*—P. M. Pecori
*Attorney*—Eugene M. Whitacre

ABSTRACT: A signal distribution system includes a filter which separates UHF television signals from VHF television and FM radio signals. a tv receiver (VHF tuner) and an FM receiver are each coupled to the filter by a diode. Energization of a desired receiver causes an appropriate diode to be forward biased and electrically connect the filter to the desired receiver.

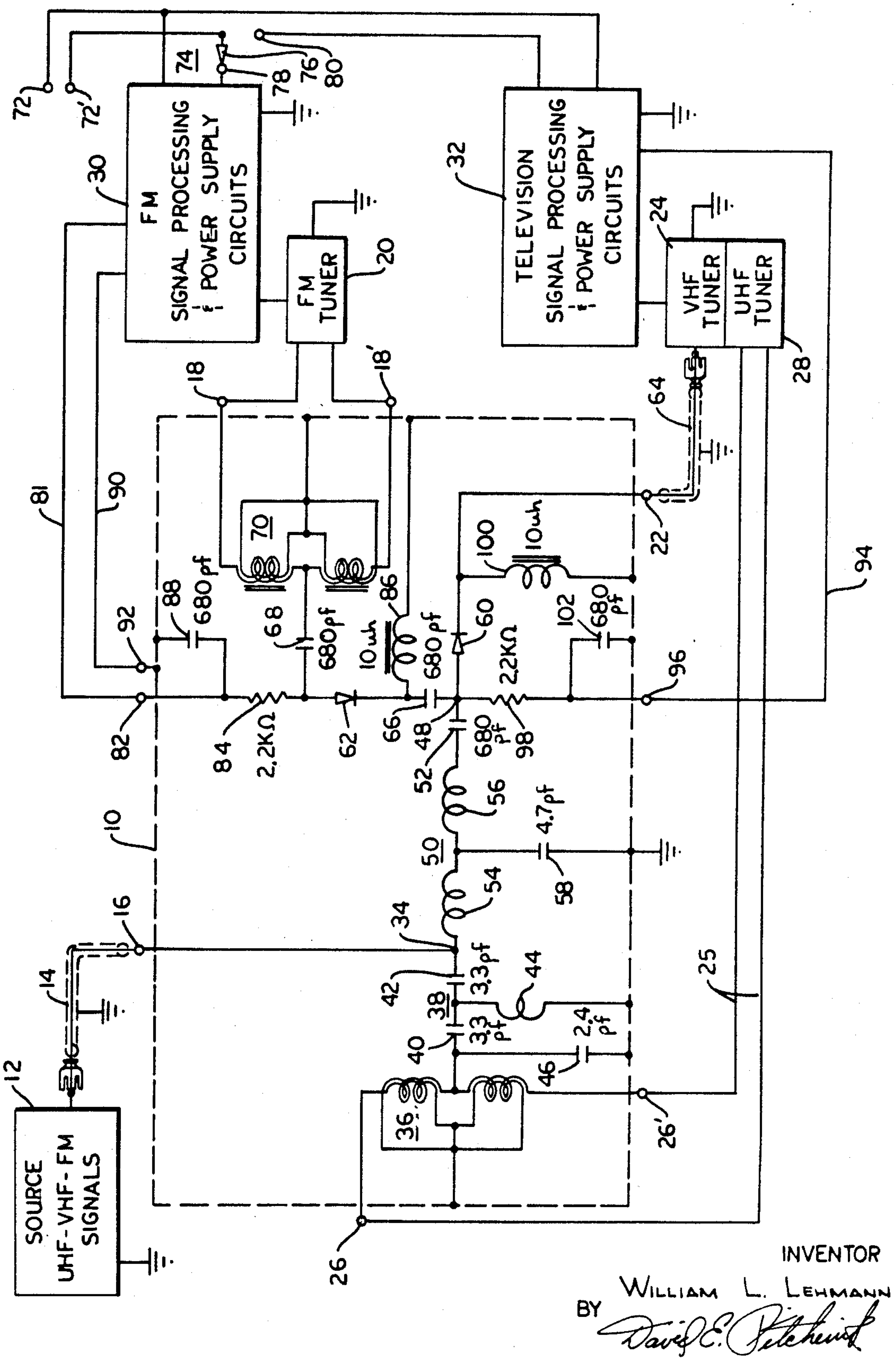
INVENTOR
WILLIAM L. LEHMANN
BY David E. Pitchenik
Attorney

SIGNAL DISTRIBUTION SYSTEM

The present invention pertains to signal distribution systems and more particularly, to signal distribution systems adapted to separate signals in the VHF, UHF and FM frequency bands.

In the transmission of VHF, FM and UHF signals through a common transmission line to TV and FM receivers, the necessity of providing an inexpensive and reliable signal distribution system has become increasingly important. The several signals are generally intercepted by an antenna array and subsequently conveyed to a remote location, possibly after amplification, via coaxial cable as in institutional and home cable TV systems.

Division of the VHF and UHF signals is relatively easy because of the wide frequency separation between these bands. The assigned VHF television frequency band in the United States extends from 54 MHz through 216 MHz, while the UHF television frequency band extends from 470 megacycles to 890 megacycles. Thus, the UHF bands are separated by a frequency gap or guard band of 254 MHz. This wide frequency separation permits the utilization of a high pass UHF and a low-pass VHF passive filter splitter system without particular signal degradation because the cutoff frequency for the high and low pass filters are far removed from the desired bandpass range. Consequently, problems of signal attenuation and phase shift are minimal.

Since the assigned FM radiofrequency band in the United States extends from 88 MHz to 108 MHz which is between the assigned frequencies for channels 6 and 7, the FM signals as well as VHF signals will pass through the low-pass filter. The top of the channel 6 bandpass 88 MHz, and the bottom of the channel 7 bandpass 174 MHz, provides a frequency gap of 86 MHz for the FM radio band and several other communications services. The lowest frequency FM channel 201 (88.0 to 88.2 MHz) is separated from VHF channel 6 by a frequency gap of 25 kHz. which is included as part of the FM channel 201 frequency allocation. Each succeeding FM channel has 200 kHz. frequency band including a 25 kHz. gap between adjacent channels. A relatively large frequency gap of 66 MHz separates the highest FM channel 300 (107.8 MHZ to 108.0 MHz) and VHF channel 7. The 66 MHz gap is utilized for military and commercial purposes.

Because of the small FM-VHF frequency band separation, a filter system capable of separating the FM band from the channel 20 to 6 segment of the VHF band, is difficult to realize and would require many sections, extremely critical to build and align. Moreover, serious problems of signal attenuation and phase shift would raise. Consequently, in UHF-VHF-FM signal distribution systems, it has been the usual practice to provide a mechanical switch mechanism which selectively interconnects the VHF TV tuner and the FM tuner with a low-pass VHF filter network. The utilization of mechanical switching, however, results in the usual difficulties associated with the switching of high frequency signals. With the passage of time and use the switch contacts begin to oxidize or accumulate dirt which can cause impedance mismatch and, in the extreme, cause a switch malfunction. Moreover, separate switches must be actuated to turn on the selected receiver and interconnect it with the filter network.

Some prior art signal splitting systems use resistive and reactive matrices to separate outputs from a common signal source. These systems introduce a great deal of signal attenuation, and thereby limit their use to strong signal areas. Still other prior art signal splitting systems employ booster RF amplifiers which provide amplified signals to offset signal attenuation. These system, however, are generally costly and can result in cross-modulation and degraded signal-to-noise ratios due to the necessarily wide band characteristics of the RF amplifier.

A signal distribution system embodying the present invention includes a source of signals of a first and second frequency range. A filter means is coupled to the source of signals and passes signals within the first and second frequency range. Electronic switch means selectively connect one of a first and a second signal channel with the filter means. The first signal channel is adapted to process signals within the first range of frequencies and the second signal channel is adapted to process signals within the second range of frequencies.

A complete understanding of the invention may be obtained from the following detailed description when taken in conjunction with the accompanying drawing in which:

The single FIGURE is a schematic circuit diagram, partly in block diagram, partly in block form, of a signal distribution system embodying the present invention.

Referring not to the drawing, a signal splitter 10 is coupled to a source of signals 12 by a grounded coaxial cable 14. The source of signals may be a master antenna, a relay station, or the like, for the reception and distribution of UHF, VHF and FM signals to a remote location. The splitter 10 receives the signals at a single input 16 and provides three outputs; a first at terminal 18—18′ to an FM tuner 20, a second at terminal 22 to a VHF television tuner 24, and a third at terminals 26—26′ to a UHF television tuner 28.

The various signals are heterodyned in their respective tuners to provide an IF signal to the signal processing circuitry. Thus, the FM tuner 20 is interconnected with FM signal processing and power supply circuits 30, and the VHF tuner 24 and UHF tuner 28 are interconnected with television signal processing and power supply circuits 32.

The UHF, VHF and FM signals from the source 12 pass through the transmission line 14 to a junction 34. UHF signals appearing at junction 34 are coupled to a balun transformer 36 by a high-pass filter 38 which includes the series connected capacitors 40 and 42 and the shunt connected inductor 44 and is designed to have a cutoff frequency of approximately 350 MHZ. The balun transformer 36 provides an impedance transformation such that the transformer output impedance at the terminals 26—26′ will match the input impedance of the UHF tuner 28. Transformer 36 is connected to UHF tuner 28 by means of a twin lead transmission line 25 of the same characteristic impedance as transformer 36 and tuner 28. This insures maximum UHF signal power transfer from the balun transformer 36 to the UHF tuner 28. A capacitor 46 is coupled between the balun input and a point of reference potential, shown as ground, to realize the minimum loss of UHF signal power between filter 38 and transformer 36. The balun transformer 36 is a conventional bifilar wound transformer with an air core.

VHF and FM signals appearing at the junction 34 are coupled to a junction 48 by a low-pass filter 50 and a DC blocking capacitor 52. The low-pass filter 50 includes two series inductors 54 and 56 and a shunt capacitor 58 and is also designed to have a cutoff frequency of approximately 350 MHz. VHF and FM signals at the junction point 48 are selectively passed through an electronic switch means (which includes two switching diodes 60 and 62) to the FM tuner 20 and the VHF tuner 24. The switching diode 60 connects the junction 48 and a VHF TV tuner antenna input cable terminal 22. Since the VHF tuner 24, as shown, has an unbalanced 75 ohm input impedance the terminal 22 may be coupled to the tuner via a 75 ohm grounded coaxial cable 64, with proper impedance match and, hence, maximum signal power transfer. VHF and FM signals appearing at the junction 48 pass through the diode 60 (when forward biased) and the coaxial cable 64 into the VHF tuner 24. Selectivity for discriminating between VHF and FM channels is provided in the tunable resonant circuits of the VHF tuner.

Similarly, VHF and FM signals appearing at the junction 48 pass through a DC blocking capacitor 66, the second switching diode 62 (when forward biased) and a DC blocking capacitor 68 to a balun transformer 70. The balun transformer is a conventional bifilar wound ferrite core transformer and provides an impedance transformation from the 75 ohm balun input to a 300 ohm output impedance at the output terminals 18—18′ for impedance matching with the FM tuner antenna input impedance. Selectivity for discriminating between VHF and FM channels is provided in the tunable resonant circuits of the FM tuner.

Electrical power for the FM signal processing and power supply circuits 30 and for the television signal processing and power supply circuits 32 is obtained from a source of potential which may be applied at terminals 72—72'. A switch 74, including a movable contact 76 and stationary contacts 78 and 80, selectively connects the source of power to the FM circuits 30 and the television circuits 32.

When the switch 74 is positioned, as shown, such that the FM signal processing and power supply circuits 30 are energized, a voltage derived from a convenient point in the FM circuits is applied over a wire 81 to a terminal 82. This causes a current to flow, between the terminal 82 and a point of reference potential, shown as ground, through the series connected resistor 84, diode 62 and a ferrite core inductor 86. DC blocking capacitors 66 and 68 prevent the flow of DC current into the junction 48 and the balun transformer 70, respectively. An undesired flow of VHF, UHF and FM signals from terminal 82 into the FM circuitry is prevented by a signal bypass capacitor 88 coupled between the terminal 82 and the point of reference potential. A common point of reference potential for the signal distribution system is obtained by interconnecting the various circuit grounds. Since the FM receiver is not interconnected with the splitter 10 by a grounded coaxial cable as are the source 12 and the TV receiver (VHF tuner 24) a separate ground connection wire 90 and terminal 92 are required.

When the switch 74 is positioned to connect the source of electrical power with the television signal processing and power supply circuits 32, a voltage, derived from a convenient point in the television circuits 32, is applied over a wire 94 to a terminal 96. The voltage at terminal 96 causes a DC current to flow to the point of reference potential through the series connected resistor 98, PIN diode 60 and ferrite core inductor 100. DC blocking capacitors 52 and 66 prevent the flow of DC current from the junction point 48 into the low-pass filter 50 and the ferrite core inductor 86, respectively. A signal bypass capacitor 102 interconnects the terminal 96 and the point of reference potential to prevent the passage of undesired VHF, UHF and FM signals from terminal 96 into the television circuits 32 and vice versa.

In operation, when the FM circuits 30 are energized the diode 62 is forward biased and permits the flow of VHF and FM signals into the balun transformer 70 and, hence, the FM tuner 20. At this time the television circuits 32 are not energized and, consequently, no voltage is applied to the terminal 96 to forward bias the diode 60. Diode 60, therefore, presents a high impedance between the junction 48 and the splitter terminal 22. This in effect decouples the VHF tuner from the low-pass filter and prevents an interaction between the VHF tuner and low-pass filter circuits which would degrade the band-pass characteristics and signal power output of the filter. It is to be understood that the signal amplitude at junction 48 is insufficient to drive the diode 60 into conduction.

When the television circuits 32 are energized, the diode 60 is forward biased and interconnects the junction 48 and the terminal 22, permitting a flow of VHF and FM signals into the VHF tuner 24. The diode 62, at this time, is not forward biased because the FM receiver does not provide a voltage at the terminal 82 and the signal amplitude at junction 48 is insufficient to drive the diode into conduction. Consequently, the diode 62 presents a high impedance between the balun transformer 70 and the junction 48 and, in effect, decouples the FM tuner from the low-pass filter. This prevents an undesired interaction between the FM tuner circuitry and the low-pass filter which would degrade bandpass and signal power output characteristics of the filter.

I claim:

1. A signal distribution system comprising:
a source of VHF television and FM radio signals;
a source of electrical power;
a first signal channel including resonant circuits for processing said VHF television signals, said first channel operable when energized by said source of electrical power and a second signal channel including resonant circuits for processing said FM radio signals, said second signal channel operable when energized by said source of electrical power;
filter means coupled to said source of signals and adapted to pass said VHF television and said FM radio signals;
electronic switch means for selectively connecting one of said first and said second channels with said filter means, said electronic switch means including a first electronic device coupled between said first channel and said filter and a second electronic device coupled between said second channel and said filter;
a switch adapted to interconnect one of said first and said second channels with said source of electrical power to energize said channel; and
means interconnecting said electronic switch means with said first and said second channel such that when said first channel is interconnected with said source of electrical power, said first device exhibits a low impedance and said second device exhibits a high impedance which decouples the resonant circuits of said first and said second signal channel, and when said second channel is interconnected with said source of electrical power; said second device exhibits a low impedance and said first device exhibits a high impedance which decouples the resonant circuits of said first and said second signal channel.

2. A signal splitter system as defined in claim 1 wherein said first and said second electronic devices are diodes.

3. A signal splitter system as defined in claim 2 wherein said first channel is an FM radio receiver and said second channel is a TV receiver.

4. A signal distribution system comprising:
a source of electrical power;
a source of VHF television signals and FM radio signals;
a television tuner for processing said VHF television signals and including tunable resonant circuits, said television tuner operable when energized by said source of electrical power;
a radio tuner for processing said FM radio signals and including tunable resonant circuits, said radio tuner operable when energized by said source of electrical power;
filter means coupled to said source of signals and adapted to pass said VHF television and FM radio signals;
a first electronic switch device coupled between said filter and said television tuner;
a second electronic switch device coupled between said filter and said radio tuner;
a switch adapted to interconnect one of said television tuner and said radio tuner with said source of electrical power; and
said first and second switch devices operable such that when said television tuner is interconnected with said source of electrical power, said first electronic switch device exhibits a low impedance and said second electronic switch device exhibits a high impedance which decouples the tunable resonant circuits of said television and said radio tuners, and when said radio tuner is interconnected with said source of electrical power, said second electronic switch device exhibits a high impedance which decouples the tunable resonant circuits of said television and said radio tuners.

* * * * *

UNITED STATES PATENT OFFICE
CERTIFICATE OF CORRECTION

Patent No. 3,631,348 Dated December 28, 1971

Inventor(s) William L. Lehmann

It is certified that error appears in the above-identified patent and that said Letters Patent are hereby corrected as shown below:

In the Abstract, line 3, "a tv" should read -- A TV --. Column 1, line 19, "the UHF bands" should read -- the VHF and UHF bands --; line 45, "channel 20" should read -- channel 2 --; line 49, delete "raise" and insert -- arise --; line 67, delete "system" and insert -- systems --. Column 2, lines 8-9, delete "partly in block diagram". Column 4, line 65, after "exhibits" insert -- a low impedance and said first electronic switch device exhibits --.

Signed and sealed this 26th day of December 1972.

(SEAL)
Attest:

EDWARD M.FLETCHER,JR.
Attesting Officer

ROBERT GOTTSCHALK
Commissioner of Patents